(12) United States Patent
Weitzel

(10) Patent No.: US 6,639,049 B2
(45) Date of Patent: Oct. 28, 2003

(54) PROCESS FOR THE PREPARATION OF POLYMERS HAVING A REDUCED CONTENT OF VOLATILE COMPONENTS

(75) Inventor: Hans-Peter Weitzel, Reischach (DE)

(73) Assignee: Wacker Polymer Systems & Co. KG, Burghausen (DE)

( * ) Notice: Subject to any disclaimer, the term of this patent is extended or adjusted under 35 U.S.C. 154(b) by 54 days.

(21) Appl. No.: 10/046,320

(22) Filed: Nov. 9, 2001

(65) Prior Publication Data

US 2002/0165341 A1 Nov. 7, 2002

(30) Foreign Application Priority Data

Dec. 14, 2000 (DE) .......................................... 100 62 177

(51) Int. Cl.⁷ .............................................. C08G 64/00
(52) U.S. Cl. ........................ 528/502; 524/803; 524/820; 524/823; 524/825; 524/513; 524/514; 524/503; 524/460; 525/57; 526/202; 526/209; 526/210; 526/303.1; 526/317
(58) Field of Search ................................. 524/513, 514, 524/459, 503, 460, 803, 823, 820, 825; 525/57; 526/202, 209, 210, 303.1, 317; 528/502

(56) References Cited

U.S. PATENT DOCUMENTS

| 4,532,295 A | 7/1985 | Brabetz et al. | |
|---|---|---|---|
| 5,767,231 A | 6/1998 | Schull et al. | |
| 6,300,403 B1 * | 10/2001 | Mayer et al. | 524/459 |

FOREIGN PATENT DOCUMENTS

| DE | 41 18 526 A1 | 12/1991 |
|---|---|---|
| DE | 195 26 759 A1 | 1/1997 |
| DE | 196 29 948 A1 | 1/1998 |
| DE | 197 11 741 A1 | 9/1998 |
| DE | 197 41 185 A1 | 3/1999 |
| DE | 197 41 189 A1 | 3/1999 |
| DE | 197 45 580 A1 | 4/1999 |
| DE | 198 28 183 A1 | 12/1999 |
| DE | 198 37 856 A1 | 2/2000 |
| EP | 0 134 451 A1 | 3/1985 |
| EP | 0 465 964 A1 | 1/1992 |
| EP | 0 505 959 A2 | 9/1992 |
| EP | 0 650 977 A1 | 5/1995 |
| EP | 0 693 501 A1 | 1/1996 |
| EP | 1 065 225 A1 | 1/2001 |

OTHER PUBLICATIONS

Derwent Abstract Corresponding to EP 693 501 [AN 1996–041088].
Derwent Abstract Corresponding To DE 198 37 856 [AN 2000–206998].
Derwent Abstract Corresponding To DE 197 41 185 [AN 1999–205903].
Derwent Abstract Corresponding To EP 0 505 959 [AN 1992–325274].
Derwent Abstract Corresponding To DE 197 41 189 [AN 1999–205905].
Derwent Abstract Corresponding To DE 197 45 580 [AN 1999–255798].
Derwent Abstract Corresponding To DE 41 18 526 [AN 1992–000700].
Derwent Abstract Corresponding To DE 198 28 183 [AN 2000–064596].
Derwent Abstract Corresponding To EP 0 465 964 [AN 1992–017607].
Fox T.G., Bull. Am. Physics Soc. 1, 3 p. 123 (1956).
Polymer Handbook, $2^{nd}$ Edition, J. Wiley & Sons, New York (1975).
Derwent Abstract Corresponding To DE 195 26 759 [AN 1997–088323].
Derwent Abstract Corresponding To DE 198 37 856 [AN 2000–206998].
Derwent Abstract Corresponding To DE 197 11 741 [AN 1998–507576].
Derwent Abstract Corresponding To DE 196 29 948 [AN 1998–088852].
German Search Report—Mailed Dec. 14, 2000.
Derwent Abstract Corresponding To EP–A 465 964 [AN 1992–017607].
Derwent Abstract Corresponding To EP–A 1 065 225 [AN 2001–1839222].

* cited by examiner

Primary Examiner—Terressa M. Boykin
(74) Attorney, Agent, or Firm—Brooks Kushman P.C.

(57) ABSTRACT

The invention relates to a process for the preparation of polymers stabilized with protective colloids in the form of water-redispersible powders or aqueous dispersions thereof having a reduced content of volatile components, by a) polymerizing by emulsion or suspension polymerization, one or more monomers from the group consisting of vinyl esters, (meth)acrylates, vinyl aromatics, olefins, 1,3-dienes and vinyl halides and optionally further monomers copolymerizable therewith, b) aftertreating the polymer dispersion thus obtained by means of postpolymerization, distillation, and/or introduction of steam or inert gas to obtain a residual content of volatile, nonaqueous components of <2000 ppm, and c) spray drying of aftertreated polymer dispersion to a residual content of volatile, nonaqueous components of <400 ppm, the dispersion being adjusted prior to spray drying to a solids content of <45% by weight before spraying, the spray drying performed with gas at an inlet temperature of >120° C., and optimally d) redispersing of the resulting powder in water.

24 Claims, No Drawings

US 6,639,049 B2

PROCESS FOR THE PREPARATION OF POLYMERS HAVING A REDUCED CONTENT OF VOLATILE COMPONENTS

BACKGROUND OF THE INVENTION

The invention relates to a process for the preparation of polymers stabilized with protective colloids and water-redispersible powders or aqueous dispersions having a reduced content of volatile components prepared therefrom.

DESCRIPTION OF THE RELATED ART

A growing ecological consciousness has resulted in more strenuous requirements on the market with respect to freedom from residual monomers and solvents in many polymer products. These requirements together are characterized by the term "VOC-free" (VOC=volatile organic compound). While VOC-free polymer dispersions are now common, this is not yet the case with redispersion powders. Possible explanations for this are that the volatile components in solid products are more difficult to remove than in liquid products, and that the volatile components become chemically bound when redispersion powders are used in many aqueous formulations. For example, residual vinyl acetate is hydrolyzed directly to calcium acetate and acetaldehyde in applications in cement media the main field of use of redispersion powders, the acetaldehyde immediately undergoing aldol condensations. The same occurs with other esters, such as methyl or ethyl acetate, and with acetone (aldol condensation).

However, very recent investigations have shown that considerable contamination by volatile components can nevertheless occur; for example, acetaldehyde is liberated when vinyl acetate-based redispersion powders are used in levelling compounds or floor toppings. The acetaldehyde is present in the powder or is formed by hydrolysis from residual vinyl acetate present in the powder.

A number of processes for removing volatile components from polymers are known from the prior art. A distinction may be made between chemical and physical deodorizing processes. The chemical processes are distinguished by the addition of substances which react with the residual monomer and thus reduce their content. The physical processes are substantially based on distillation or stripping phenomena with steam or inert gases such as nitrogen as entraining agents. In addition, combinations of these two processes have been described.

DE-A 19741185 describes the reduction of residual monomer content of polymer dispersions by postpolymerization with a special redox system comprising carboxylic acid and peroxide compounds. A further chemical process for removing residual monomers from polyvinyl ester dispersions is disclosed in EP-B 505959. In the latter reference, the polyvinyl ester dispersion is subjected to hydrolysis at weakly alkaline pH followed by a subsequent oxidative treatment. DE-A 19741189 describes a chemical process for removing residual monomers, in which a nucleophilic agent is metered into a specially dimensioned reactor in a defined mixing time.

The physical removal of volatile residues from polymer dispersions by passing in steam is disclosed in DE-A 19745580, and removal by means of inert gas, for example air or nitrogen, is disclosed in DE-A 4118526. A combined process for removing volatile components, in which first a postpolymerization with redox initiator and then an inert gas treatment are carried out, is disclosed in DE-A 19828183. In the process from EP-A 650977, the residual monomers are first removed by postpolymerization and then by means of steam stripping. EP-A 465964 describes a process for removing volatile components from emulsion polymers, these first being spray-dried and the powder then being aftertreated with inert gas.

It is known that chemical measures reduce residual monomer content by introducing other volatile components, such as tert-butanol and acetone, into the dispersion. It is, however, senseless and uneconomical to carry out these measures to achieve extremely low residual monomer content, since at the same time the content of other volatile components increases disproportionately. On the other hand, it is known that physical deodorization can result in damage to the dispersion, ranging from the presence of specks to coagulum. Exclusive physical deodorization is therefore also not expedient since the products are likely to be damaged owing to high levels of contamination, even with processes according to the latest state of the art. The considerable amounts of condensate contaminated with organic components, about 10 to 20%, based on the dispersion used, which, depending on the composition, have to be disposed of by expensive procedures, constitute further considerable disadvantages of physical deodorization.

An additional problem in the preparation of redispersion powders is the use of methanol-containing polyvinyl alcohol as a protective colloid during spraying. This protective colloid is added to the dispersion only after chemical and physical deodorization, so that the methanol content of the dispersion is high as a result.

It would be desirable to provide an economical process for the preparation of polymers stabilized with protective colloids in the form of water-redispersible powders or aqueous dispersions which have a reduced content of volatile components. It would be further desirable to provide such a process which avoids the disadvantages of the prior art.

SUMMARY OF THE INVENTION

The invention relates to a process for the preparation of polymers stabilized with protective colloids in the form of water-redispersible powders or aqueous dispersions which have a reduced content of volatile components, this process comprising a) polymerizing by emulsion or suspension polymerization, one or more monomers from the group consisting of vinyl esters, (meth)acrylates, vinyl aromatics, olefins, 1,3-dienes and vinyl halides and, if required, further monomers copolymerizable therewith, b) aftertreating the polymer dispersion thus obtained by means of postpolymerization and/or distillation, and introduction of steam or inert gas to a residual content of volatile, nonaqueous components of <2000 ppm, and then c) spray drying the aftertreated polymer dispersion to a residual content of volatile, nonaqueous components of <400 ppm, the dispersion being adjusted to a solids content of <45% by weight before spraying, the spray drying carried out with air at an inlet temperature of >120° C, and optionally, d) redispersing the resulting powder in water.

Volatile components (VOC) are understood as meaning nonaqueous compounds, such as residual monomers, decomposition products of monomer and initiator, impurities in polymerization assistants and the like; for example, residual monomers such as vinyl acetate, alkyl (meth)

acrylate and styrene; decomposition products or impurities such as acetaldehyde, methanol, ethanol, tert-butanol, acetone, methyl acetate, and ethyl acetate.

Preferred vinyl esters are those of carboxylic acids having 1 to 12 C atoms. Vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, for example VeoVa9$^R$ or VeoVa10$^R$ (trade names of Shell), are more preferred. Vinyl acetate is particularly preferred.

Suitable monomers from the group consisting of acrylates or methacrylates are esters of straight-chain or branched alcohols having 1 to 15 carbon atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are particularly preferred.

Preferred vinyl aromatics are styrene, methylstyrene and vinyltoluene. A preferred vinyl halide is vinyl chloride. The preferred olefins are ethylene and propylene and the preferred dienes are 1,3-butadiene and isoprene.

If required, 0.1 to 5% by weight, based on the total weight of the monomer mixture, of auxiliary monomers may also be copolymerized. Preferably, 0.5 to 2.5% by weight of auxiliary monomers are used. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and maleic anhydride and ethylenically unsaturated sulfonic acids and their salts, preferably vinyl sulfonic acid and 2-acrylamido-2-methylpropanesulfonic acid. Further examples are pre-crosslinking comonomers, such as polyethylenically unsaturated comonomers such as divinyl adipate, diallyl maleate, allyl methacrylate or triallyl cyanurate, and post-crosslinking comonomers, for example acrylamidoglycolic acid (AGA), methyl acrylamidoglycolic acid methyl ester (MAGME), N-methylolacrylamide (NMA), N-methylolmethacrylamide, -methylolallylcarbamate, alkyl ethers or esters of N-methylolacrylamide, -methylolmethacrylamide and N-methylolallylcarbamate, such as the isobutoxy ethers. Comonomers having epoxide functional groups such as glycidyl methacrylate and glycidyl acrylate, are also suitable. Further examples are comonomers having silicon functional groups, such as acryloyloxypropyltri(alkoxy)- and methacryloyloxypropyltri(alkoxy)silanes, vinyltrialkoxysilanes and vinylmethyldialkoxysilanes, it being possible, for example, for ethoxy and ethoxypropylene glycol ether radicals to be present as alkoxy groups. Monomers having hydroxyl or CO groups may also be mentioned, for example hydroxyalkyl methacrylates and acrylates such as hydroxyethyl, hydroxypropyl or hydroxybutyl acrylate or methacrylate, and compounds such as diacetoneacrylamide and acetylacetoxyethyl acrylate or methacrylate.

Monomers or monomer mixtures which contain one or more monomers from the group consisting of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene are particularly preferred. Most preferred are mixtures comprising vinyl acetate and ethylene; mixtures comprising vinyl acetate, ethylene and a vinylester of α-branched monocarboxylic acids having 9 to 11 C atoms; mixtures comprising n-butyl acrylate and 2-ethylhexyl acrylate and/or methyl methacrylate; mixtures comprising styrene and one or more monomers from the group consisting of methyl acrylate, ethyl acrylate, propyl acrylate, n-butyl acrylate and 2-ethylhexyl acrylate; mixtures comprising vinyl acetate and one or more monomers from the group consisting of methyl acrylate, ethyl acrylate, propyl acrylate, n-butyl acrylate, 2-ethylhexyl acrylate and optionally ethylene; and mixtures comprising 1,3-butadiene and styrene and/or methyl methacrylate and optionally further acrylates. These mixtures may also optionally contain one or more of the abovementioned auxiliary monomers, and each of these preferred mixtures may be free of auxiliary monomers or other monomers other than those specified, if desired.

The choice of monomers and/or the choice of the amounts by weight of comonomers is made in such a way that in general, a glass transition temperature ("Tg") of −50° C. to +50° C., preferably −30° C. to +40° C., results. The Tg of the polymer can be determined conventionally by means of differential scanning calorimetry (DSC). The Tg can also be calculated approximately beforehand using the Fox equation. According to T. G. Fox, BULL. AM. PHYSICS SOC. 1, 3, page 123 (1956), the following is applicable: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers appear in the POLYMER HANDBOOK, 2nd Edition, J. Wiley & Sons, New York (1975).

The polymers are prepared in a conventional manner by a emulsion polymerization process or by a suspension polymerization process, preferably by the emulsion polymerization process, the polymerization temperature being in general from 40° C. to 100° C., preferably from 60° C. to 90° C. In the copolymerization of gaseous comonomers, such as ethylene, 1–3-butadiene or vinyl chloride, superatmospheric pressure, in general from 5 bar to 100 bar, may be employed.

The polymerization is initiated with water-soluble or monomer-soluble initiators or redox initiator combinations customarily used for emulsion polymerization or suspension polymerization. Examples of water-soluble initiators are the sodium, potassium and ammonium salts of peroxodisulfuric acid, hydrogen peroxide, tert-butyl peroxide, tert-butyl hydroperoxide, potassium peroxodiphosphate, tert-butyl peroxypivalate, cumyl hydroperoxide, isopropylbenzyl monohydroperoxide and azobisisobutyronitrile. Examples of monomer-soluble initiators are diacetyl peroxydicarbonate, dicyclohexyl peroxydicarbonate and dibenzoyl peroxide. The initiators are generally used in an amount of 0.01 to 0.5% by weight, based on the total weight of the monomers. Combinations of said initiators in combination with reducing agent(s) May be used as redox initiators. Suitable reducing agents are the sulfites and bisulfites of alkali metals and of ammonium, for example sodium sulfite, derivatives of sulfoxylic acid such as zinc or alkali metal formaldehyde sulfoxylates, for example sodium hydroxymethanesulfonate, and ascorbic acid. The amount of reducing agent is preferably 0.01 to 0.5% by weight, based on the total weight of the monomers.

Molecular weight regulating substances (chain transfer agents) may be used for controlling the molecular weight during polymerization. If regulators are used, they are usually employed in amounts of 0.01 to 5.0% by weight based on the monomers to be polymerized, and may be metered separately, or may be premixed with one or more reaction components before being metered. Examples of such substances are n-dodecyl mercaptan, tert-dodecyl mercaptan, mercaptopropionic acid, methyl mercaptopropionate, isopropanol and acetaldehyde. Preferably, no regulating substances are used.

Suitable protective colloids are partially hydrolyzed polyvinyl alcohols; polyvinylpyrrolidones; polyvinyl acetals; polysaccharides in water-soluble form, such as starches (amylose and amylopectin), and celluloses and their derivatives such as the carboxymethyl, methyl, hydroxyethyl and hydroxypropyl derivatives; proteins such as casein or caseinates, soybean protein and gelatin; ligninsulfonates; synthetic polymers such as (meth)acrylic acid, copolymers of (meth)acrylates with comonomer units having carboxyl functional groups, poly(meth)acrylamide, polyvinylsulfonic acids and their water-soluble copolymers; melamine formaldehyde sulfonates, naphthalene formaldehyde sulfonates and styrene maleic acid and vinyl ether/maleic acid copolymers.

Partially hydrolyzed or completely hydrolyzed polyvinyl alcohols are preferred. Partially hydrolyzed polyvinyl alcohols having a degree of hydrolysis of 80 to 95 mol % and a Höppler viscosity, in 4% strength aqueous solution, of 1 to 30 mPa·s (Höppler method at 20° C., DIN 53015) are particularly preferred. Partially hydrolyzed, hydrophobically modified polyvinyl alcohols having a degree of hydrolysis of 80 to 95% mol and a Höppler viscosity, in 4% strength aqueous solution, of 1 to 30 mPa·s are also suitable. Examples of these are partially hydrolyzed copolymers of vinyl acetate with hydrophobic comonomers such as isopropenyl acetate, vinyl pivalate, vinyl ethylhexanoate, vinyl esters of saturated, alpha-branched monocarboxylic acids having 5 or 9 to 11 C atoms, dialkyl maleates and dialkyl fumarates such as diisopropyl maleate and diisopropyl fumarate; vinyl chloride; vinyl alkyl ethers such as vinyl butyl ether; and olefins, such as ethene and decene. The amount of the hydrophobic unit is preferably 0.1 to 10% by weight, based on the total weight of the partially hydrolyzed polyvinyl alcohol. Mixtures of these polyvinyl alcohols may also be used.

Further suitable polyvinyl alcohols are partially hydrolyzed polyvinyl alcohols which have been rendered hydrophobic and are obtained by polymer-analogous reaction, for example acetalation of vinyl alcohol moieties with $C_1$- to $C_4$-aldehydes such as butyraldehyde. The amount of the hydrophobic units is preferably 0.1 to 10% by weight, based on the total weight of the partially hydrolyzed polyvinyl acetate. The degree of hydrolysis is 80 to 95 mol %, preferably 85 to 94 mol %, and the Höppler viscosity (DIN 53015, Höppler method, 4% strength aqueous solution) is preferably from 1 to 30 mPa·s, more preferably 2 to 25 mPa·s.

Most preferred are polyvinyl alcohols having a degree of hydrolysis of 85 to 94 mol % and a Höppler viscosity, in 4% strength aqueous solution, of 3 to 15 mPa·s (Höppler method at 20° C., DIN 53015). The protective colloids are obtainable by processes known to those skilled in the art.

In the process according to the invention, polymerization is preferably effected without the addition of emulsifiers. In certain cases, it may be advantageous additionally to use small amounts of emulsifiers, for example 1 to 5% by weight, based on the total amount of monomers. Suitable emulsifiers are anionic, cationic and nonionic emulsifiers, for example anionic surfactants, such as alkylsulfates having a chain length of 8 to 18 C atoms, alkyl or alkylaryl ether sulfates having 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

The protective colloids are generally added during the polymerization in a total amount of 1 to 20% by weight, based on the total weight of the monomers. The protective colloid may be either completely introduced initially, or partly introduced initially and partly metered in during the polymerization. Preferably, at least 5% by weight of the protective colloid is initially introduced, and most preferably all of the protective colloid is initially introduced.

The monomers can be initially introduced in total, metered in in total or initially introduced in parts and the remainder metered in after initiation of the polymerization. In a preferred procedure, 50 to 100% by weight, based on the total weight of the monomers, are initially introduced and the remainder is metered in. The metering can be carried out separately or some or all of the components to be metered can be preemulsified before being metered. The metering may be continuous or in increments.

In the preparation of low-VOC redispersion powders based on polymers stabilized with polyvinyl alcohol as the protective colloid, the methanol content of the polyvinyl alcohol used is of considerable importance. As a result of their preparation, polyvinyl alcohols contain considerable amounts of methanol. Methanol may be introduced along with the polyvinyl alcohol introduced into the dispersion in which the polyvinyl alcohol acts as a protective colloid during polymerization, or may be introduced with the polyvinyl alcohol which is added as a protective colloid before spray drying, introducing methanol into the system at this point. Being inert with respect to the other constituents, methanol can be separated only by physical methods such as distillation. Advantageously, this separation occurs during the preparation of the polyvinyl alcohol solution itself prior to its addition to the polymerization batch, or the separation of methanol takes place from the prepared dispersion, prior to spraying. Industrially produced products are sold with about 3% by weight of methanol. In the context of the present invention, polyvinyl alcohol having a residual content of <2% by weight is preferably used, more preferably polyvinyl alcohol containing <1% by weight of methanol.

As an alternative to removing methanol during the preparation of the polyvinyl alcohol solution, the methanol can, of course, be separated by steam distillation of the dispersion. However, it should be ensured that the distillation is carried out at the correct point in the process chain, i.e. ideally only when the polyvinyl alcohol, which serves as a protective colloid for spraying, has already been added. However, this generally cannot be realized in practice since the physical deodorization is effected in plants other than the plant used for the spray drying, so that the removal of methanol during the dissolution step is preferable. A continuous distillation over a column, upstream of the spray drying, can be considered as a further variant, which however requires considerable additional costs in terms of process engineering.

After the end of the polymerization, the amount of volatile, nonaqueous components in the dispersion obtained is reduced to ≦2000 ppm, preferably ≦1000 ppm, most preferably ≦500 ppm. This can be effected by means of postpolymerization, by distillation, or by means of inert gases such as steam, or by a combination of these measures.

Redox initiator systems, for example those comprising the abovementioned oxidizing agents and reducing agents, may be used for a postpolymerization. In general, an initiator system which differs from that used for the main polymerization is employed for the postpolymerization. Redox combinations of hydrogen peroxide, sodium or potassium peroxide or tert-butyl hydroperoxide with sodium sulfite, alkali metal formaldehyde sulfoxylates or ascorbic acid, are preferred for the postpolymerization. The postpolymerization is carried out in general at temperatures of from 30° C. to from 60° C. and over a period of 0.5 to 3 hours. The components of the redox system can be added in portions or may be metered in continuously. The amount of oxidizing agent and reducing agent is in general 0.01 to 0.4% by weight, based on total monomer weight.

The volatile components may also be removed by means of distillation, preferably under reduced pressure, or while passing inert entraining gases such as air, nitrogen or steam through or over the dispersion. In a preferred procedure for aftertreatment with steam, not more than 5 to 10% by weight of condensate, based on the weight of dispersion, is introduced. In general, the aftertreatment is carried out at 50° C. to 80° C., under a reduced pressure of 200 to 500 mbar and over a period of one to three hours. In the first step for removing the volatile components, the postpolymerization is particularly preferably combined with an inert gas treatment.

For the preparation of the water-redispersible polymer powders the aqueous dispersions are spray-dried after the addition of protective colloids as spraying assistants. The solids content of the dispersion is adjusted to values below 45% by weight, preferably 30 to 40% by weight, before the spray drying. The spray drying is carried out in conventional spray drying units, it being possible to effect atomization by means of airless high-pressure nozzles, binary nozzles, multi-medium nozzles, or by means of a rotating disk. What is important is that the inlet temperature of the gas stream is >120° C. By means of the spray drying, the content of nonaqueous, volatile components in the powder is reduced to values of <400 ppm, preferably in the range of 1 to 250 ppm, and in particular from 1 to 50 ppm. The gas employed in spray drying may be any gas inert to the product, but is preferably air.

As a rule, the spraying assistant is used in a total amount of 3 to 30% by weight, based on the polymeric components of the dispersion. This means that the total amount of the protective colloid before the drying process should be at least 3 to 30% by weight, based on the polymer fraction, and preferably from 5 to 20% by weight.

Suitable spraying assistants are partially hydrolyzed polyvinyl alcohols; polyvinylpyrrolidones; polysaccharides in water-soluble form, such as starches (amylose and amylopectin), celluloses and their carboxymethyl, methyl, hydroxyethyl and hydroxypropyl derivatives; proteins, such as casein or caseinate, soybean protein, gelatin; ligninsulfonates; synthetic polymers, such as poly(meth)acrylic acid, copolymers of (meth)acrylates with comonomer units having carboxyl functional groups, poly(meth)acrylamide, polyvinylsulfonic acids and their water-soluble copolymers; melamine formaldehyde sulfonates, naphthalene formaldehyde sulfonates and styrene/maleic acid and vinyl ether/maleic acid copolymers.

Polyvinyl alcohols having a degree of hydrolysis of from 80 to 95 mol % and a Höppler viscosity, in 4% strength aqueous solution, of 1 to 30 mPa·s (Höppler method at 20° C., DIN 53015) are preferred. Most preferably, no protective colloids other than polyvinyl alcohols are used as spraying assistants.

A content of up to 1.5% by weight of antifoam, based on the weight of the base polymers, has proven advantageous during spraying. In order to increase the storability by improving the blocking stability, in particular in the case of powders having a low glass transition temperature, the powder obtained can be treated with an anticaking agent, preferably in an amount of up to 30% by weight, based on the total weight of polymeric components. Examples of anticaking agents are calcium carbonate, magnesium carbonate, talc, gypsum, silica, kaolins, and silicates, preferably having particle sizes in the range from 10 nm to 10 μm.

In order to improve the performance characteristics, further additives may be introduced during the spraying. Further components of dispersion powder compositions, which are present in preferred embodiments, are, for example, pigments, fillers, foam stabilizers and water repellents.

Aqueous polymer dispersions having a reduced content of volatile, nonaqueous components are obtained by redispersion of the spray-dried powders with water. Usually, solids contents of 50 to 60% by weight are established. In the preparation of a 50% strength redispersion, the proportion of volatile components in ppm is reduced by half again compared with the powder.

The aqueous polymer dispersions and the water-redispersible polymer powders stabilized with the protective colloids can be used in the applications typical for them, for example, in chemical products for the building industry, if necessary in combination with hydraulically setting binders such as cements (Portland cement, high-alumina cement, trass cement, slag cement, magnesia cement and phosphate cement), gypsum or waterglass, for the production of construction adhesives, in particular for preparing tile adhesives and heat-insulating adhesives, renders, filling compounds, floor filling compounds, levelling compounds, sealing slurries, joint mortars and paints, and also as binders for coating materials and adhesives or as coating materials and binders for textiles, fibers, wood and paper.

The examples below serve for further illustrating the invention. Example 1 sets forth the general method for the preparation of the dispersion and of the powder.

EXAMPLE 1

An aqueous dispersion of a vinyl acetate/ethylene copolymer comprising 100 parts by weight of vinyl acetate and 12 parts by weight of ethylene were prepared by means of conventional emulsion polymerization. The polymerization was carried out in the presence of 10% by weight, based on vinyl acetate, of a polyvinyl alcohol having a degree of hydrolysis of 88 mol % and a Höppler viscosity of 4 mPa·s and a methanol content of about 2% by weight. A dispersion having a VOC content of 6000 ppm, including 5000 ppm of vinyl acetate, was obtained.

The above dispersion was mixed with 5% by weight (solid/solid) of polyvinyl alcohol having a degree of hydrolysis of 88 mol % and a Höppler viscosity of 4 mPa·s, and diluted with water. The dispersion was then sprayed by means of a binary nozzle. The spraying component used was air precompressed to 4 bar. The dry powder obtained was mixed with 10% by weight of commercial anticaking agent, a mixture of calcium magnesium carbonate and magnesium hydrosilicate.

Comparative Example C1

The dispersion from example 1 was postpolymerized with 0.1% by weight of tert-butyl hydroperoxide (TBHP) and with 0.1% by weight of sodium sulfite, based in each case on total monomer weight, at a temperature of 45° C. for one hour until a VOC content of 1600 ppm (including 1000 ppm of vinyl acetate) was obtained. Before spray drying, the solids content of the feed dispersion was adjusted to 45%. By spray drying at an air inlet temperature of 117° C., the following residual VOC values in the powder were achieved:

| | |
|---|---|
| Vinyl acetate | 480 ppm |
| Acetaldehyde | 32 ppm |
| Methanol | 16 ppm |
| tert-Butanol | 62 ppm |
| Acetone | 20 ppm |
| Methyl acetate | 34 ppm |
| Ethyl acetate | 54 ppm |
| Total: | 698 ppm |

EXAMPLE 2

The dispersion from example 1 was stripped with 2% by weight of steam per hour, based on dispersion weight, for 3 h until a residual VOC content of 1000 ppm (vinyl acetate <400 ppm) was obtained. Spray drying was carried out analogously to example 1, except that the dispersion was adjusted to a solids content of 40% and then sprayed with air at an inlet temperature of 125° C. The following residual VOC values in the powder were achieved:

| | |
|---|---|
| Vinyl acetate | 82 ppm |
| Acetaldehdye | 2 ppm |
| Methanol | 10 ppm |
| tert-Butanol | 10 ppm |
| Acetone | 10 ppm |
| Methyl acetate | 10 ppm |
| Ethyl acetate | 10 ppm |
| Total: | 134 ppm |

EXAMPLE 3

The dispersion from example 1 was postpolymerized analogously to Comparative Example C1 with TBHP and sodium sulfite until a residual vinyl acetate level of <1000 ppm was obtained and was then stripped, analogously to example 3, with 2% by weight of steam per hour for 3 h. The residual VOC content was about 200 ppm (vinyl acetate <100 ppm). Spray drying was performed analogously to Example 2: the solids content of the feed was adjusted to 40%, and spray drying was effected at an air inlet temperature of 125° C. The following residual VOC values were achieved:

| | |
|---|---|
| Vinyl acetate | 12 ppm |
| Acetaldehyde | 2 ppm |
| Methanol | 10 ppm |
| tert-Butanol | 10 ppm |
| Acetone | 10 ppm |
| Methyl acetate | 16 ppm |
| Ethyl acetate | 10 ppm |
| Total: | 70 ppm |

Comparative Example C2

The dispersion from example 1 was merely stripped, analogously to example 3, with 2% by weight of steam per hour for 5 h. The following residual VOC values of the 50% strength dispersion were obtained:

| | |
|---|---|
| Vinyl acetate | 9 ppm |
| Acetaldehyde | 1 ppm |
| Methanol | 9 ppm |
| tert-Butanol | 5 ppm |
| Acetone | 5 ppm |
| Methyl acetate | 5 ppm |
| Ethyl acetate | 5 ppm |
| Total: | 39 ppm |

The sieve residue on filtration over a 70 μm sieve increased from 289 ppm (before stripping) to 427 ppm.

Comparative Example C3

The dispersion from example 1 was postpolymerized analogously to Example 3 with TBHP and sodium sulfite until a residual vinyl acetate level of <1000 ppm was obtained and was then stripped with 2% by weight of steam per hour for 4 h. The 50% strength dispersion contained:

| | |
|---|---|
| Vinyl acetate | 19 ppm |
| Acetaldehyde | 1 ppm |
| Methanol | 37 ppm |
| tert-Butanol | 5 ppm |
| Acetone | 5 ppm |
| Methyl acetate | 5 ppm |
| Ethyl acetate | 5 ppm |
| Total: | 77 ppm |

The sieve residue on filtration over a 70 μm sieve increased from 133 ppm (before stripping) to 232 ppm.

Comparative Example C4

The dispersion from example 1 was postpolymerized analogously to Example 3 with TBHP and sodium sulfite until a residual VOC content of about 5000 ppm (vinyl acetate about 4000 ppm) was obtained. The solids content of the feed was adjusted to 40% by weight and spray drying was then performed analogously to example 1 at an air inlet temperature of 125° C. The following residual VOC values in the powder were obtained:

| | |
|---|---|
| Vinyl acetate | 900 ppm |
| Acetaldehyde | 28 ppm |
| Methanol | 20 ppm |
| tert-Butanol | 22 ppm |
| Acetone | 10 ppm |
| Methyl acetate | 16 ppm |
| Ethyl acetate | 30 ppm |
| Total: | 1026 ppm |

Comparative Example C5

The dispersion from example 1 was postpolymerized analogously to Example 3 with TBHP and brüggolite until a residual VOC content of about 1600 ppm (vinyl acetate <1000 ppm) was obtained. The solids content of the feed was adjusted to 45% by weight. By spray drying at an air inlet temperature of 126° C., the following residual VOC values were achieved.

| | |
|---|---|
| Vinyl acetate | 340 ppm |
| Acetaldehyde | 24 ppm |
| Methanol | 10 ppm |
| tert-Butanol | 56 ppm |
| Acetone | 18 ppm |
| Methyl acetate | 24 ppm |
| Ethyl acetate | 42 ppm |
| Total: | 514 ppm |

EXAMPLE 4

The dispersion from example 1 was postpolymerized analogously to Example 3 with TBHP and sodium sulfite until a residual VOC level of about 1000 ppm was obtained. The solids content of the feed was adjusted to about 40% by weight before spraying. By spray drying at an air inlet temperature of 125° C., the following residual VOC values in the powder were obtained:

| | |
|---|---|
| Vinyl acetate | 60 ppm |
| Acetaldehyde | 2 ppm |
| Methanol | 14 ppm |
| tert-Butanol | 110 ppm |
| Acetone | 22 ppm |
| Methyl acetate | 20 ppm |
| Ethyl acetate | 22 ppm |
| Total: | 250 ppm |

Comparative Example C6

The dispersion from example 1 was postpolymerized analogously to Example 3 with TBHP and sodium sulfite until a residual VOC level of about 1600 ppm (vinyl acetate <1000 ppm) was obtained. The solids content of the feed was adjusted to 45% by weight before spraying. By subsequent spray drying at an air inlet temperature of 135° C., the following residual VOC values in the powder were obtained:

| | |
|---|---|
| Vinyl acetate | 360 ppm |
| Acetaldehyde | 26 ppm |
| Methanol | 10 ppm |
| tert-Butanol | 54 ppm |
| Acetone | 18 ppm |
| Methyl acetate | 24 ppm |
| Ethyl acetate | 44 ppm |
| Total: | 536 ppm |

Comparative Example C7

The dispersion from example 1 was postpolymerized analogously to Example 3 with TBHP and sodium sulfite until a residual VOC level of about 1600 ppm (vinyl acetate <1000 ppm) was obtained. The solids content of the feed was adjusted to about 40% by weight before spraying. By subsequent spray drying at an air inlet temperature of 103° C., the following residual VOC values in the powder were achieved:

| | |
|---|---|
| Vinyl acetate | 240 ppm |
| Acetaldehyde | 18 ppm |
| Methanol | 18 ppm |
| tert-Butanol | 44 ppm |
| Acetone | 12 ppm |
| Methyl acetate | 14 ppm |
| Ethyl acetate | 28 ppm |
| Total: | 374 ppm |

The comparison of the procedure of Example 2 with Comparative Example C2 or of Example 3 with Comparative Example C3 shows that effective removal of VOCs is possible in a gentle manner by the procedure according to the invention, whereas the dispersion is damaged by coagulum formation by VOC removal by steam stripping and/or postpolymerization alone.

If Comparative Example C1 is compared with Comparative Example C7 and Example 4, it is seen that the boundary conditions of the spray drying are important for the effectiveness of VOC removal. In Comparative Example C1, the solids content of the feed is too high and the air inlet temperature is too low, while in Comparative Example C7 the solids content of the feed is correctly chosen but the inlet temperature is too low. In Example 4, under conditions according to the invention, the VOC removal is substantially more effective.

In comparison with Example 4, Comparative Example C4 shows that, in the case of ineffective VOC removal before the spray drying, the VOC removal is less effective even when the spray drying is performed according to the inventive spray drying condition.

Comparative Example C5 shows that, in comparison with Comparative Example C1 with higher inlet temperature during spray drying, better results are obtained, but with an excessively high solids content of the feed, the VOC removal is still unsatisfactory.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. By the terms "a" and "an" in the claims is meant "one or more" unless specified otherwise.

What is claimed is:

1. A process for the preparation of polymers stabilized with protective colloids in the form of their water-redispersible powders or aqueous dispersions prepared therefrom, said water-redispersible powders and aqueous dispersions prepared therefrom having a reduced content of volatile components, said process comprising:
   a) polymerizing by emulsion or suspension polymerization, one or more primary monomers selected from the group consisting of vinyl esters, (meth)acrylates, vinyl aromatics, olefins, 1,3-dienes and vinyl halides, and optionally, further monomers copolymerizable therewith;
   b) aftertreating the polymer dispersion obtained from said polymerizing by means of postpolymerization, distillation, introduction of steam or inert gas or a combination thereof to obtain a polymer dispersion having a residual content of volatile, nonaqueous components of <2000 ppm;

c) spray drying the aftertreated polymer dispersion obtained in step b) to obtain a water-redispersible power having a residual content of volatile, nonaqueous components of <400 ppm, the dispersion being adjusted to a solids content of <45% by weight prior to spray drying, and the spray drying carried out with gas at inlet temperature of >120° C., and optionally, d) redispersing the resulting powder in water.

2. The process of claim 1, wherein primary monomers or primary monomer mixtures which contain one or more monomers selected from the group consisting of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene comprise said primary monomers.

3. The process of the preparation of polymers stabilized with protective colloids in the form of their water-redispersible powders or aqueous dispersions prepared therefrom, said water-redispersible powders and aqueous dispersions prepared therefrom having a reduced content of volatile components, said process comprising:

a) polymerizing by emulsion or suspension polymerization, one or more primary monomers selected from the group consisting of vinyl esters, (meth)acrylates, vinyl aromatics, olefins, 1,3-dienes and vinyl halides, and optionally, further monomers copolymerizable therewith;

b) aftertreating the polymer dispersion obtained from said polymerizing by means of postpolymerization, distillation, introduction of steam or inert gas or a combination thereof to obtain a polymer dispersion having a residual content of volatile, nonaqueous components of <2000 ppm:

c) spray drying the aftertreated polymer dispersion obtained in step b) to obtain a water-redispersible power having a residual content of volatile, nonaqueous components of <400 ppm, the dispersion being adjusted to a solids content of <45% by weight prior to spray drying, and the spray drying carried out with gas at inlet temperature of >120° C., and optionally, d) redispersing the resulting powder in water;
wherein the protective colloids comprise at least one of partially hydrolyzed polyvinyl alcohols having a degree of hydrolysis of 80 to 95 mol % and a Höppler viscosity of 1 to 30 mPa·s or partially hydrolyzed, hydrophobically modified polyvinyl alcohols having a degree of hydrolysis of 80 to 94 mol % and a Höppler viscosity of 1 to 30 mPa·s.

4. A process for the preparation of polymers stabilized with protective colloids in the form of their water-redispersible powders or aqueous dispersions prepared therefrom, said water-redispersible powders and aqueous dispersions prepared therefrom having a reduced content of volatile components, said process comprising;

a) polymerizing by emulsion or suspension polymerization, one or more primary monomers selected from the group consisting of vinyl esters, (meth)acrylates, vinyl aromatics, olefins, 1,3-dienes and vinyl halides, and optionally, further monomers copolymerizable therewith;

b) aftertreating the polymer dispersion obtained from said polymerizing by means of postpolymerization, distillation, introduction of steam or inert gas or a combination thereof to obtain a polymer dispersion having a residual content of volatile, nonaqueous components of <2000 ppm;

c) spray drying the aftertreated polymer dispersion obtained in step b) to obtain a water-redispersible power having a residual content of volatile, nonaqueous components of <400 ppm, the dispersion being adjusted to a solids content of <45% by weight prior to spray drying, and the spray drying carried out with gas at inlet temperature of >120° C., and optionally, d) redispersing the resulting powder in water;
wherein primary monomers or primary monomer mixtures which contain one or more monomers selected from the group consisting of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene comprise said primary monomers; and wherein the protective colloids comprise at least one of partially hydrolyzed polyvinyl alcohols having a degree of hydrolysis of 80 to 95 mol % and a Höppler viscosity of 1 to 30 mPa·s or partially hydrolyzed, hydrophobically modified polyvinyl alcohols having a degree of hydrolysis of 80 to 94 mol % and a Höppler viscosity of 1 to 30 mPa·s.

5. The process of claim 1, wherein the aftertreating of step b) is carried out to obtain a residual content of volatile, nonaqueous components of ≦1000 ppm.

6. The process of claim 4, wherein the aftertreating of step b) is carried out to obtain a residual content of volatile, nonaqueous components of ≦1000 ppm.

7. The process of claim 3, wherein the aftertreating of step b) is carried out to obtain a residual content of volatile, nonaqueous components of ≦1000 ppm.

8. The process of claim 1, wherein a postpolymerization, optionally including subsequent passing of inert, VOC-entraining gases through or over the polymer dispersion, comprises the aftertreating of step b).

9. The process of claim 4, wherein a postpolymerization, optionally including subsequent passing of inert, VOC-entraining gases through or over the polymer dispersion, comprises the aftertreating of step b).

10. The process of claim 3, wherein a postpolymerization, optionally including subsequent passing of inert, VOC-entraining gases through or over the polymer dispersion, comprises the aftertreating of step b).

11. The process of claim 5, wherein a postpolymerization, optionally including subsequent passing of inert, VOC-entraining gases through or over the polymer dispersion, comprises the aftertreating of step b).

12. The process of claim 1, wherein the content of volatile components in the powder is reduced to 1 to 250 ppm by spray drying in step c).

13. The process of claim 3, wherein the content of volatile components in the powder is reduced to 1 to 250 ppm by spray drying in step c).

14. The process of claim 4, wherein the content of volatile components in the powder is reduced to 1 to 250 ppm by spray drying in step c).

15. A water-redispersible polymer powder or aqueous polymer dispersion prepared by the process of claim 1, having a content of nonaqueous volatile components of 1 to 250 ppm.

16. In a construction adhesive, render, filling compound, floor filling compound, leveling compound, sealing slurry, joint mortar or paint, each optionally containing a hydraulically setting binder and containing a water-redispersible powder or aqueous dispersion thereof, the improvement comprising a water-redispersible powder or aqueous dispersion prepared by the process of claim 1.

17. In a binder for coating materials and adhesives which includes a water-redispersible polymer powder or aqueous dispersion thereof, the improvements comprising a water-redispersible powder or aqueous dispersion prepared by the process of claim 1.

18. In a coating material or binder for textiles, fibers, wood and paper containing a hydraulically setting binder and containing a water-redispersible powder or aqueous dispersion thereof, the improvement comprising a water-redispersible powder or aqueous dispersion prepared by the process of claim 1.

19. In a tile adhesive or heat-insulating adhesive comprising a water-redispersible powder or aqueous dispersion prepared by the process of claim 1.

20. The process of claim 1, wherein said aftertreating step b) consists of postpolymerization to a residual content of volatile, nonaqueous components of less than 1000 ppm.

21. In a construction adhesive, render, filling compound, floor filling compound, leveling compound, sealing slurry, joint mortar or paint, each optionally containing a hydraulically setting binder and containing a water-redispersible powder or aqueous dispersion thereof, the improvement comprising a water-redispersible powder or aqueous dispersion prepared by the process of claim 3.

22. In a construction adhesive, render, filling compound, floor filling compound, leveling compound, sealing slurry, joint mortar or paint, each optionally containing a hydraulically setting binder and containing a water-redispersible powder or aqueous dispersion thereof, the improvement comprising a water-redispersible powder or aqueous dispersion prepared by the process of claim 4.

23. In a binder for coating materials and adhesives which includes a water-redispersible polymer powder or aqueous dispersion thereof, the improvements comprising a water-redispersible powder or aqueous dispersion prepared by the process of claim 3.

24. In a binder for coating materials and adhesives which includes a water-redispersible polymer powder or aqueous dispersion thereof, the improvements comprising a water-redispersible powder or aqueous dispersion prepared by the process of claim 4.

\* \* \* \* \*

UNITED STATES PATENT AND TRADEMARK OFFICE
CERTIFICATE OF CORRECTION

PATENT NO. : 6,639,049 B2
DATED : October 28, 2003
INVENTOR(S) : Hans-Peter Weitzel It is certified that error appears in the above-identified patent and that said Letters Patent is hereby corrected as shown below:

Column 13,
Lines 3 and 38, delete "power" and insert -- powder --.
Line 18, delete "The" and insert -- A --.
Line 47, delete "H _ öppler" and insert -- Höppler --.

Column 14,
Line 5, delete "power" and insert -- powder --.

Signed and Sealed this

Twenty-fourth Day of February, 2004

JON W. DUDAS
*Acting Director of the United States Patent and Trademark Office*